(12) United States Patent
Drane

(10) Patent No.: US 8,389,858 B2
(45) Date of Patent: Mar. 5, 2013

(54) WHILE-IN-USE ELECTRICAL BOX COVER

(75) Inventor: Mark R. Drane, Germantown, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 269 days.

(21) Appl. No.: 12/862,352

(22) Filed: Aug. 24, 2010

(65) Prior Publication Data

US 2012/0048590 A1    Mar. 1, 2012

(51) Int. Cl.
*H02G 3/14* (2006.01)
*H02G 3/08* (2006.01)
*H05K 5/03* (2006.01)

(52) U.S. Cl. .......... 174/67; 174/66; 174/53; 174/58; 220/3.2; 220/3.8

(58) Field of Classification Search ............ 174/66, 174/67, 53, 58; 361/715, 755; 220/3.2, 3.5
See application file for complete search history.

(56) References Cited

U.S. PATENT DOCUMENTS

| | | | | |
|---|---|---|---|---|
| 6,559,380 B2 * | 5/2003 | Soboleski | ............ | 174/66 |
| 6,891,104 B2 | 5/2005 | Dinh | ............ | 174/67 |
| 7,235,740 B2 | 6/2007 | Dinh | ............ | 174/67 |
| 7,241,952 B2 | 7/2007 | Dinh | ............ | 174/67 |
| 7,396,997 B2 | 7/2008 | Dinh | ............ | 174/67 |
| 7,462,777 B2 * | 12/2008 | Dinh | ............ | 174/58 |
| 7,554,037 B1 * | 6/2009 | Shotey et al. | ............ | 174/67 |
| 7,626,121 B1 * | 12/2009 | Cleghorn | ............ | 174/66 |
| 2009/0211779 A1 | 8/2009 | Drane | ............ | 174/67 |
| 2010/0181091 A1 | 7/2010 | Drane | ............ | 174/66 |

* cited by examiner

*Primary Examiner* — Jayprakash N Gandhi
*Assistant Examiner* — Dion Ferguson
(74) *Attorney, Agent, or Firm* — G. Andrew Barger; Robbie Elaine Webb

(57) ABSTRACT

A while-in-use electrical box cover with an improved hinge mount is provided that prevents damage to the box cover when the hood is overstressed in the open position. A hood attaches to the base of the box cover by way of a hood hinge mount and a base hinge mount. A hinge pin, or some variance thereof, is used to couple the hood hinge mount and base hinge mount while maintaining free rotation of the pin. Hinge mounts are located in multiple positions allowing for horizontal or vertical mounting options of the hood. Some of the hinge mounts comprise compressible slots to prevent undue stresses which could potentially damage the hood or the hinge mounts located on the hood and base.

4 Claims, 5 Drawing Sheets

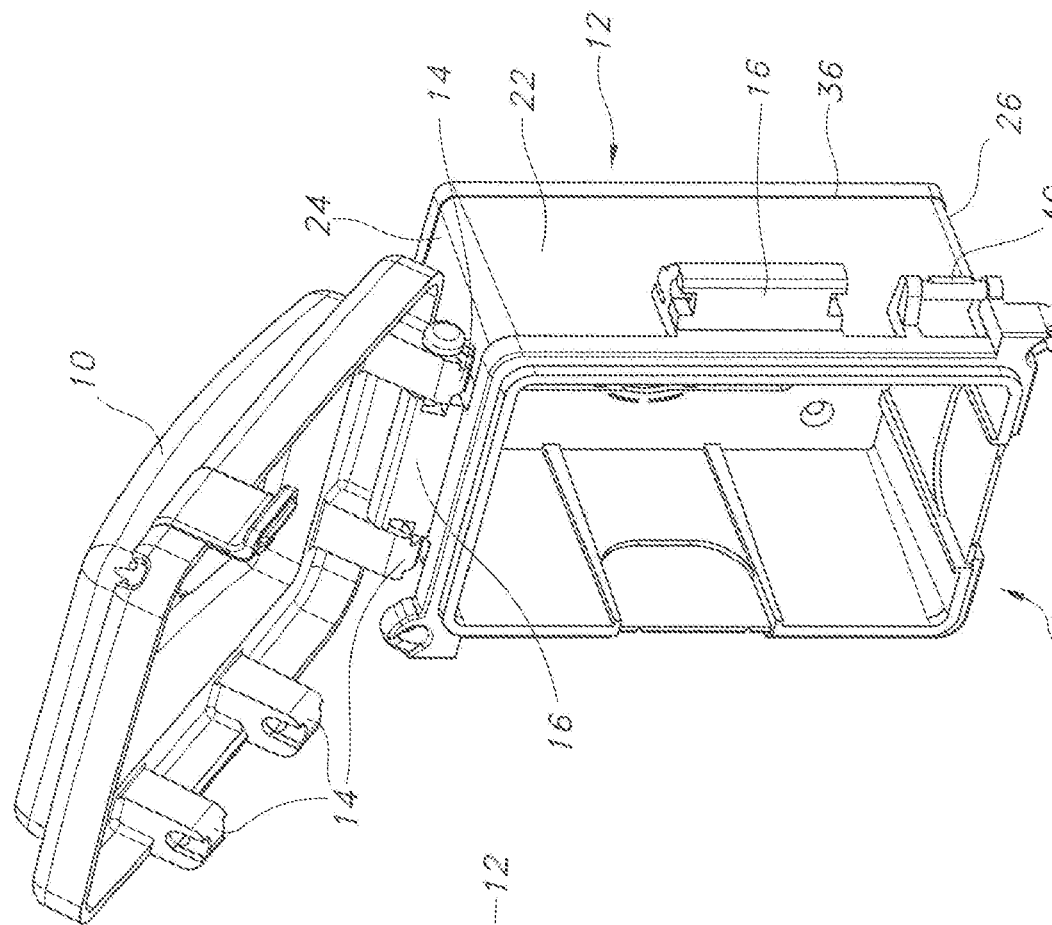
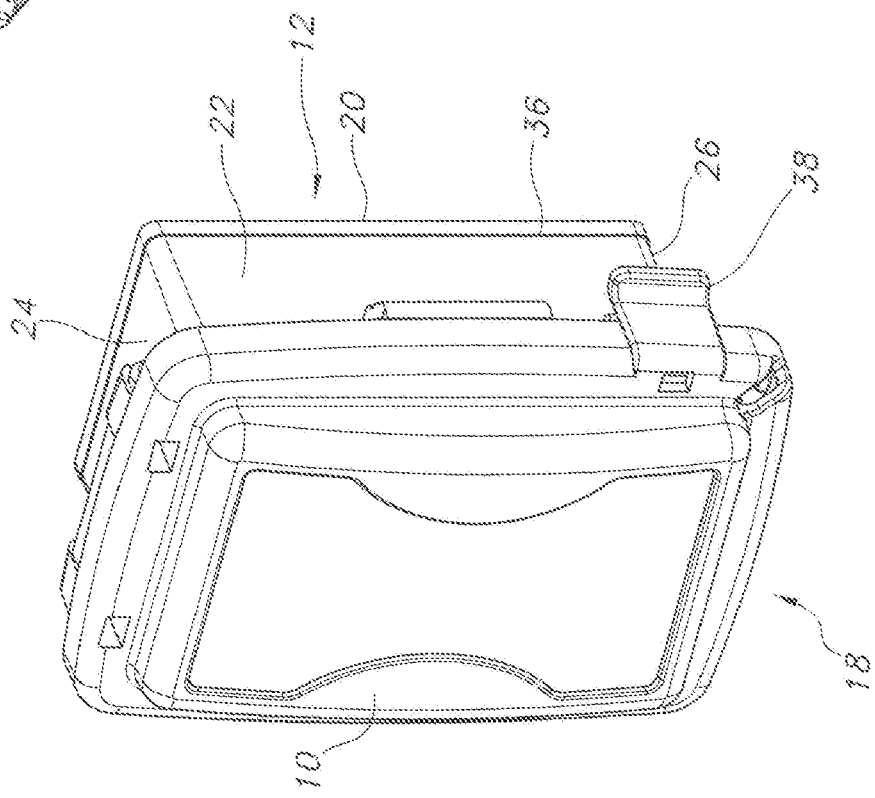

WHILE-IN-USE ELECTRICAL BOX COVER

FIELD OF THE INVENTION

In general, the present invention relates to while-in-use electrical box covers. More particularly, the present invention relates to an improved hinge mount that prevents damage to the while-in-use electrical box cover when the hood is in the open position.

BACKGROUND

While-in-use electrical box covers have been in use for many years to protect outdoor electrical outlets from the harsh elements of an outdoor environment. Most while-in-use electrical box covers consist of a base and a hood, which are attached, with the hood having the ability to be opened and closed so as to allow access to an electrical outlet. When the hood of the while-in-use electrical box cover is stressed past its normal open position, it is possible that the while-in-use electrical box cover and/or hood could be damaged, or the hood could potentially become dislodged from the while-in-use electrical box cover.

SUMMARY OF THE INVENTION

The present invention eliminates the above described disadvantages and weaknesses by providing an improved while-in-use electrical box cover. The while-in-use electrical box cover includes a base which comprises a rear wall that contains an aperture for receiving an electrical outlet, two sidewalls, a top wall and a bottom wall, all parametrically bounding the rear wall. The while-in-use electrical box cover also includes a hood that is attached to the base and has the ability to be opened and closed. Both the hood and the base contain at least one hood hinge mount and one base hinge mount, respectively. At least one of the hinge mounts is flexible such that it can absorb stress when the hood is in the open position. The hood hinge mount and the base hinge mount are capable of being coupled so that the hood opens along a horizontal axis or along a vertical axis. The while-in-use electrical box cover may have at least one hinge mount formed of flexible rubber, plastic or some other material with elastic properties such that any deformation of said hinge mount is reversible, or said hinge mount may include a compressible slot for absorbing stress that results from an overstressed hood. Alternatively, at least one hinge mount could have a portion of material removed or a portion of material that is less rigid than the surrounding hinge mount material, with either of these options serving the same purpose of absorbing stress that results from an overstressed hood.

BRIEF DESCRIPTION OF THE DRAWINGS

FIG. 1 is a front perspective view of a while-in-use electrical box cover of the present invention.

FIG. 2 is a front perspective view of an open while-in-use electrical box cover of the present invention.

DETAILED DESCRIPTION OF THE PREFERRED EMBODIMENT(S)

Figure 4:
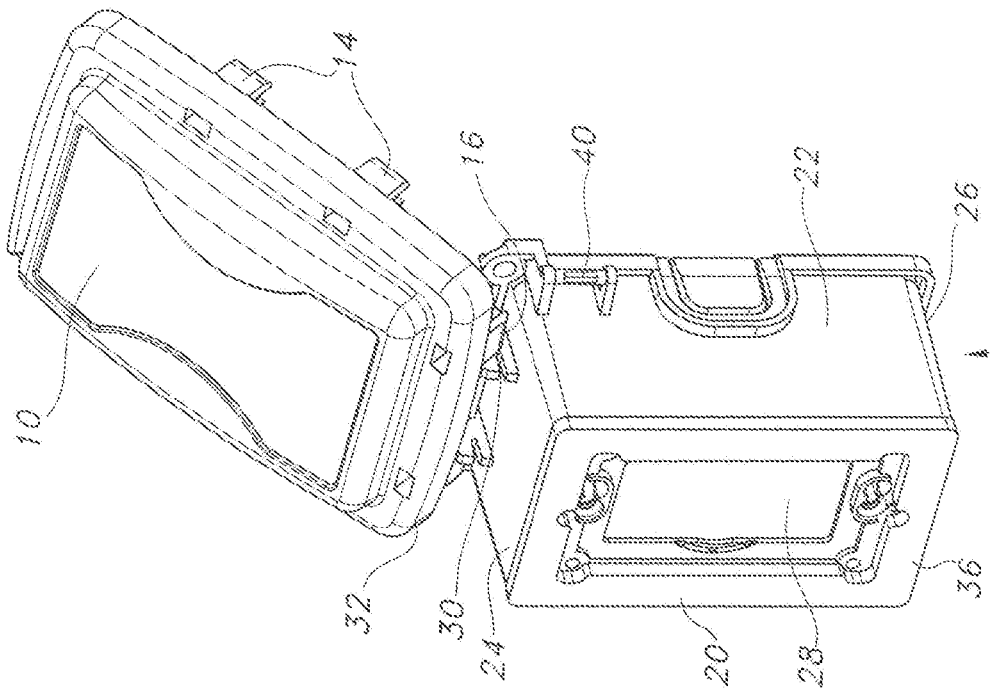
FIG. 4 is a rear perspective view of an open while-in-use electrical box cover of the present invention.

The above and other features, aspects and advantages of the present invention will now be discussed in the following detailed description of preferred embodiments and appended claims, which are to be considered in conjunction with the accompanying drawings in which identical reference characters designate like elements throughout the views.

Shown in FIG. 1 is a front perspective view of the present invention, which is an improved version of a while-in-use electrical box cover 18. In FIG. 1, a hood 10 is connected to a base 12, which has a top wall 24, a bottom wall 26, two side walls 22 and a rear wall 20. The rear wall 20 is lined by a gasket 36 to allow for a seal to be made between the preferably non-metallic while-in-use electrical box cover 18 and a wall of a building which houses an electrical outlet to be covered. Also shown in FIG. 1 is a securement tab 38 which is releasably attached to a securement catch 40, shown in FIG. 2, which allows for the hood 10 to be kept securely closed when the hood 10 is shut.

Figure 8:
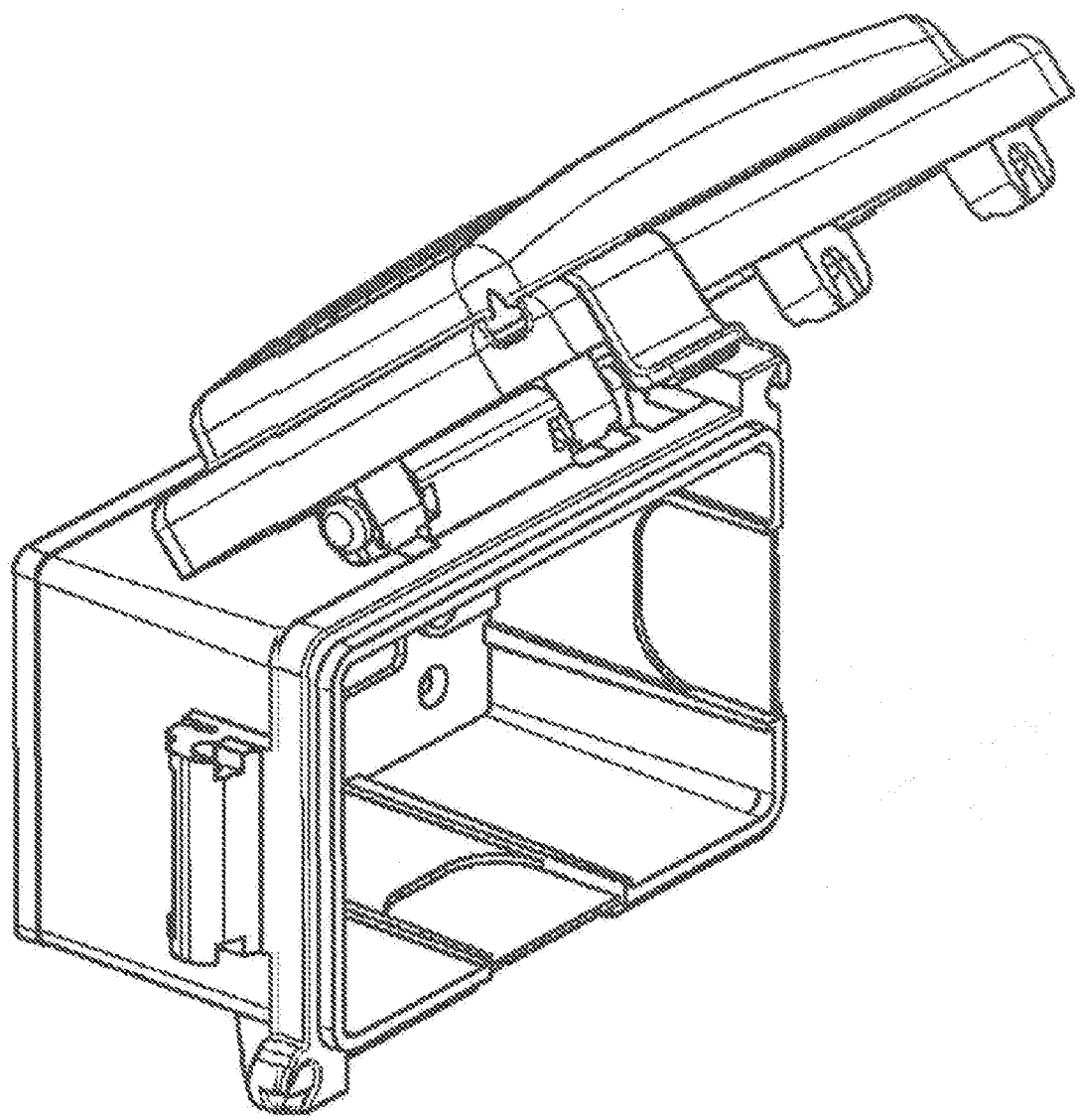
FIG. 8 is a side perspective view of an open while-in-use electrical box cover of the present invention.

Shown in FIG. 2, which is a front perspective view of the open while-in-use electrical box cover 18, is a hood hinge mount 14 and a base hinge mount 16. The hood hinge mount 14 is located on top of the hood 10 and the side of the hood 10, and the base hinge mount 16 is located on top of the base 12 and the side of the base 12. The multiple locations of the hood hinge mount 14 and the base hinge mount 16 allow for different mounting options of the hood 10 to the user. These different mounting options allow for the hood 10 to be opened along either a horizontal axis or vertical axis when the hood hinge mount 14 and the base hinge mount 16 are coupled. FIG. 8 illustrates the hood hinge mount 14 coupled to the base hinge mount 16 with the while-in-use box cover being mounted horizontally.

Figure 3:
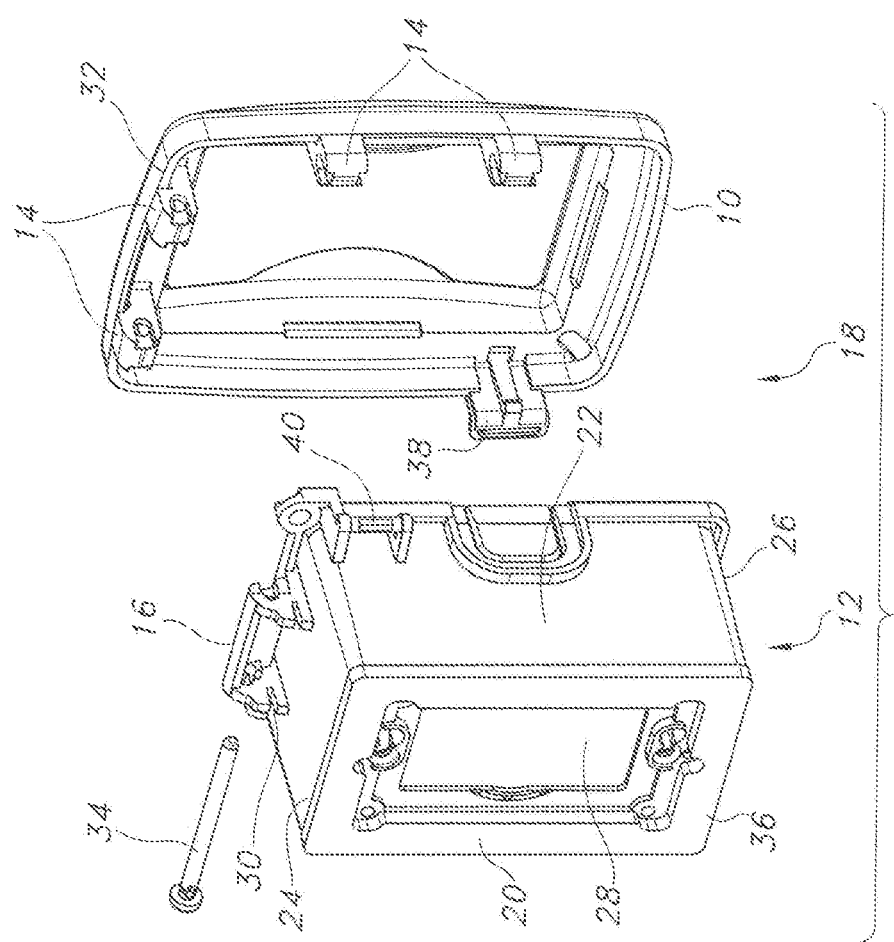
FIG. 3 is an exploded rear perspective view of a while-in-use electrical box cover of the present invention.

FIG. 3 illustrates a rear perspective exploded view of the while-in-use electrical box cover 18. This view again shows the gasket 36 which lines the rear wall 20 of the base 12. An aperture 28 which is cut out of the rear wall 20 of the base 12 is capable of receiving an electrical outlet to be covered by the while-in-use electrical box cover 18. The hood hinge mount 14 located on the top of the hood 10 and the side of the hood 10 again indicates the option to open and close the hood 10 about a horizontal axis or a vertical axis. Also shown in FIG. 3 is the base hinge mount 16 located on the top wall 24 of the base 12. In FIG. 3 the base hinge mount 16 is shown using a hinge pin 34. The hinge pin 34 allows for the hood 10 to be coupled to the base 12 when the hinge pin 34 is received through axially aligned apertures in the hood hinge mount 14 and the base hinge mount 16 while maintaining free rotation of the pin 34. Free rotation of the pin 34 is accomplished due to the fact that the apertures in the hood hinge mount 14 and the base hinge mount 16, through which the pin 34 is received, do not change shape regardless of whether the hood 10 is in the open or closed position, and, therefore, do not subject the pin 34 to any external forces. This allows the pin 34 to maintain free rotation within the apertures of the hinge mounts. This coupling of the hood hinge mount 14 to the base hinge mount 16 by way of the hinge pin 34 allows for rotation of the hood hinge mount 14 about a vertical or horizontal axis, depending on the mounting position chosen for the hood 10. It is understood that many variances of this hinge pin 34 could be used, such as a snap-on hinge which allows for the hood 10 to be removably attached to the base 12, or a plastic flexible strip which permanently attaches the hood 10 and the base 12, while allowing the hood 10 to be opened and closed. It is also understood that the base hinge mount 16 and the hood hinge mount 14 may be formed of a variety of materials, such as flexible rubber, flexible plastic or any material with elastic properties such that any deformation of the base hinge mount 16 or hood hinge mount 14 is reversible. Regardless of the type of material that the hood hinge mount 14 or the base hinge mount 16 might be formed of, the material is flexible such that the hinge mount is able to yield under stress without breaking or causing damage to the while-in-use electrical box cover 18. Further shown in FIG. 3 is a compressible portion, such as a slot 30 located on the base hinge mount 16. Although the compressible slot 30 is only shown on the base hinge mount 16 that is located on the top wall 24 of the base 12 in FIG. 3, it is understood that the compressible slot 30 may be located on any base hinge mount 16 or any hood hinge mount 14 that is part of the while-in-use electrical box cover 18. The compressible slot 30 is further described in the paragraph below.

Figure 6C:
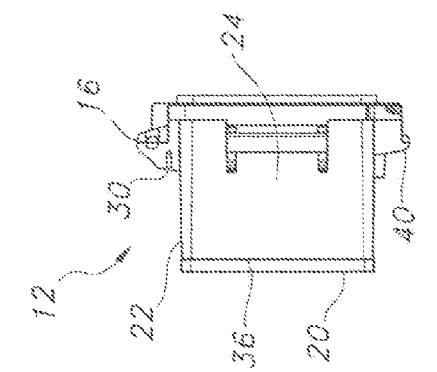
FIGS. 6A-6C are a top elevation, rear elevation and side elevation view, respectively, of the base of a while-in-use electrical box cover of the present invention.
Figure 6B:
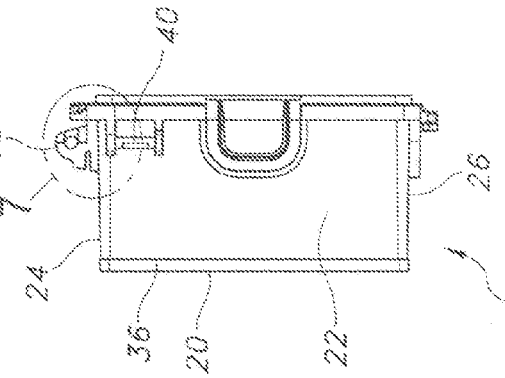
Figure 7:
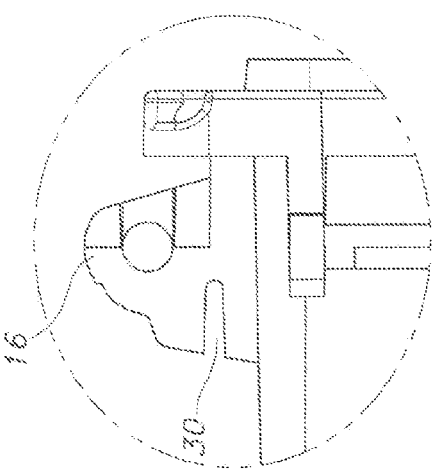
FIG. 7 is a close-up elevation view of the base hinge mount of a while-in-use electrical box covet of the present invention.
Figure 6A:
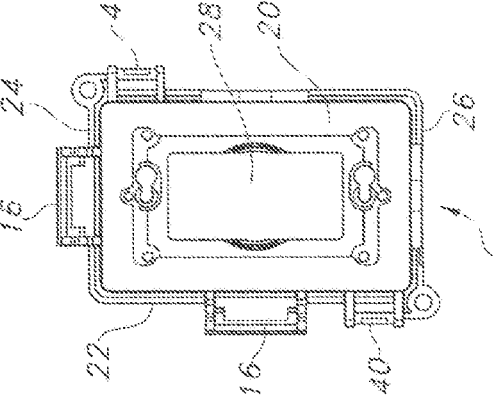
Figure 5:
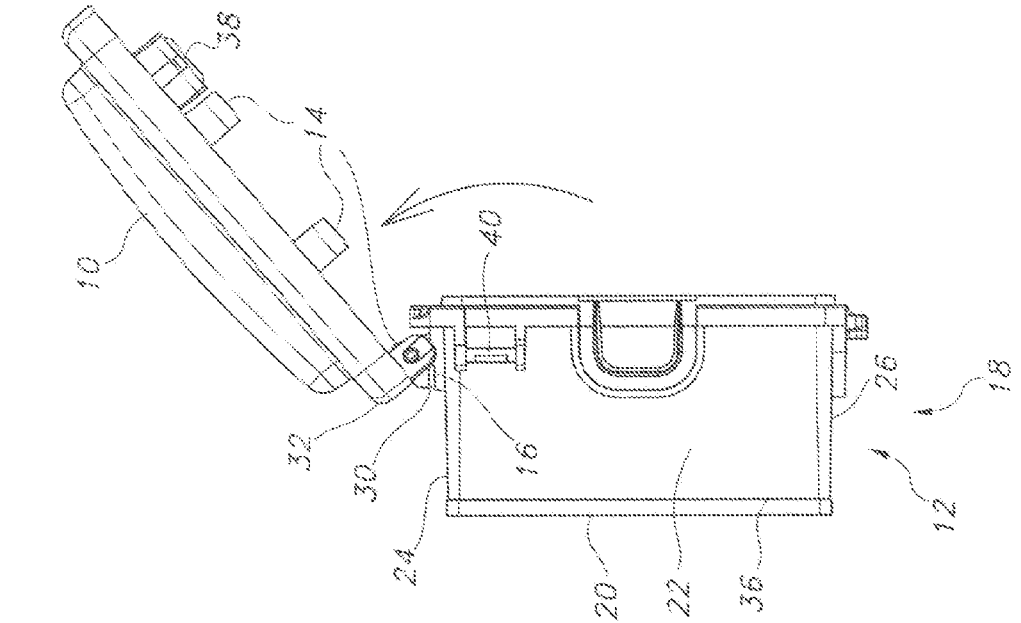
FIG. 5 is a side elevation view of an open while-in use electrical box cover of the present invention.
Figure 9:
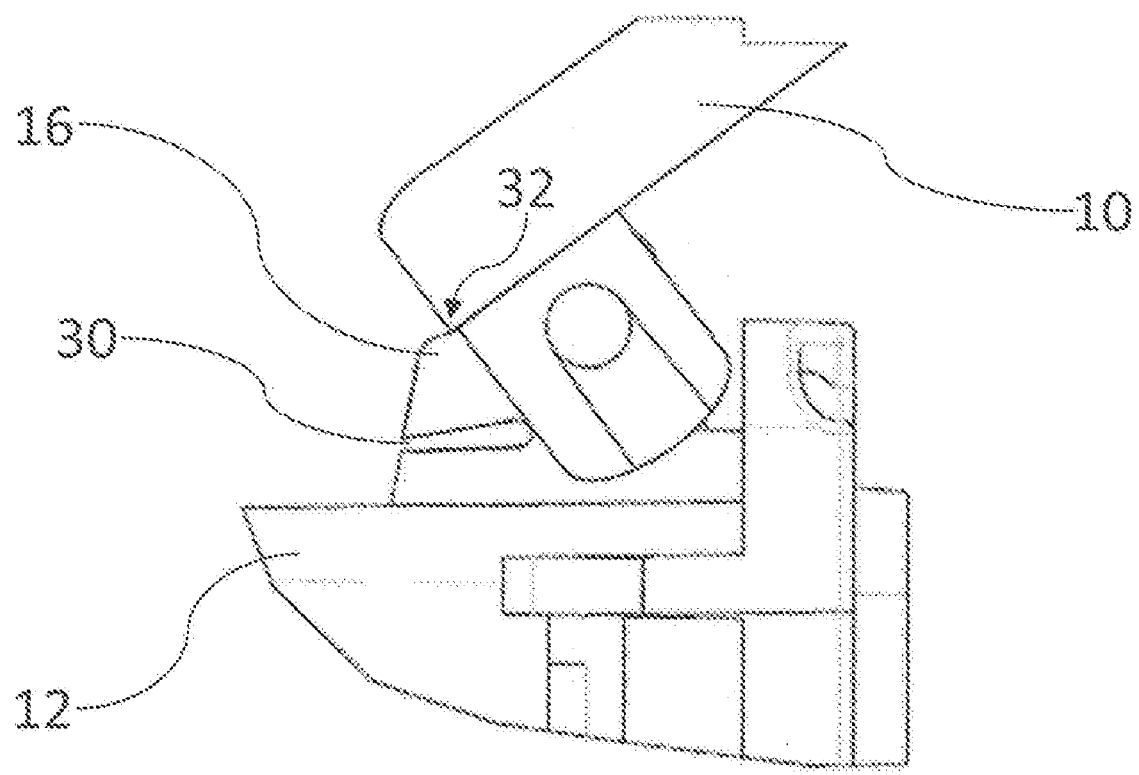
FIG. 9 is a side elevation view of the compressed slot of an open while-in-use electrical box cover of the present invention.

FIG. 4 shows a rear perspective view of the while-in-use electrical box cover 18 with the opened hood 10 attached to the base 12. In FIG. 4, the hood 10 is attached to the base 12 so that the hood 10 opens along a horizontal axis. The open position of the hood 10 shows the hood hinge mount 14 that is located on the side of the hood 10 which could be utilized if the user desired for the hood 10 to open along a vertical axis instead of along a horizontal axis. FIG. 8 illustrates the while-in-use box cover being mounted horizontally. Also shown in FIG. 4 is a lip 32 of the hood 10 which is shown contacting the base hinge mount 16 that is located on the top wall 24 of the base 12. The lip 32 can also be clearly seen in FIG. 3. FIG. 5 also shows the action of the lip 32 of the hood 10 contacting the base hinge mount 16 in an elevation view of the while-in-use electrical box cover 18. Once the hood 10 is stressed past its normal open position, which is typically at an angle that is orthogonal to the base 12 but can be at a greater or smaller angle, the lip 32 contacts the base hinge mount 16, causing the compressible slot 30 to compress and absorb stress that might be experienced by the base hinge mount 16 when the hood 10 is over-stressed in the open position. FIG. 9 illustrates the compressible slot 30 in a compressed state due to the lip 32 of the hood 10 contacting the base hinge mount 16, thereby causing the compressible slot 30 to compress. The compressible slot 30 is able to compress and absorb undue stress because it is flexible, or capable of yielding without breaking or sustaining damage, such that it prevents damage to the hood 10, base 12, hood hinge mount 14 and base hinge mount 16. Undue stress may result from the hood 10 being opened with extra force, thus decreasing the angle made between the open hood 10 and the base 12, or from the hood 10 being bumped while in the open position. While FIGS. 5, 6 and 7 show the compressible slot 30 having a slot-like shape, it is understood that the portion of material removed may be of any shape and may be removed from either a base hinge mount 16, a hood hinge mount 14, or any combination of hinge mounts. Contrary to a portion of material being removed to form the compressible slot 30 or a compressible recess of any shape, it is also understood that a hinge mount may have a portion of material that is less rigid than the surrounding material causing it to be flexible, or capable of yielding without breaking or sustaining damage, such that the portion of material is able to absorb stress when the hood 10 is overstressed in the open position. Such material can be metal or rubber, but in the preferred embodiment is thermoformed plastic.

The securement tab 38 and the securement catch 40 are also shown in FIG. 5, and the securement catch 40 is shown in two locations on the base 12 in FIG. 6. The two locations of the securement catch 40 enable the securement tab 38 to be received and allow the hood 10 to be kept securely closed when shut, regardless of the chosen mounting position of the hood 10.

FIG. 6 again shows the same parts of the while-in-use electrical box cover 18, but at rear elevation, side elevation and plan view perspectives. The side elevation view of FIG. 6 points out the detail of the compressible slot 30 of the while-in-use electrical box cover 18, shown in more detail in FIG. 7.

FIG. 7 shows a close-up elevation view of the compressible slot 30 included in the base hinge mount 16 of the while-in-use electrical box cover 18. While the previously mentioned arrangement is illustrated in FIG. 7, it is understood that the compressible slot 30 may be located on any base hinge mount 16 or hood hinge mount 14 that is part of the while-in-use electrical box cover 18 while producing the same results of absorbing stress as earlier described.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A while-in-use electrical box cover comprising:
  a base having a rear wall containing an aperture for receiving an electrical outlet, two sidewalls, a top wall, a bottom wall parametrically bounding the rear wall and a base hinge mount;
  a hood which is attached to the base having the ability to be opened and closed, the hood comprising a lip and a hood hinge mount for attachment to the base hinge mount through the use of a pin by way of the pin being simultaneously received by a plurality of apertures which are contained in the hood hinge mount and base hinge mount;
  wherein the base hinge mounts are formed of flexible plastic and have a compressible portion that absorbs stress when the lip of the hood contacts the base hinge mount when the hood is in the open position, thereby preventing any external forces from being exerted on the plurality of apertures contained in the hood hinge mount and base hinge mount, which results in free rotation of the pin that is received by the plurality of apertures contained in the hinge mounts; and
  wherein the apertures, which receive the pin, maintain their shape regardless of whether the hood is in the open or closed position.

2. The while-in-use electrical box cover of claim 1 wherein the hood hinge mount and the base hinge mount are coupled so that the hood opens along a horizontal axis.

3. The while-in-use electrical box cover of claim 1 wherein the hood hinge mount and the base hinge mount are coupled so that the hood opens along a vertical axis.

4. The while-in-use electrical box cover of claim 1 wherein at least one of the hinge mounts is formed of a material with elastic properties such that any deformation of the hinge mount is reversible.

* * * * *